United States Patent
Mech

(10) Patent No.: US 6,924,805 B2
(45) Date of Patent: Aug. 2, 2005

(54) SYSTEM AND METHOD FOR IMAGE-BASED RENDERING WITH PROXY SURFACE ANIMATION

(75) Inventor: Radomir Mech, Mountain View, CA (US)

(73) Assignee: Silicon Graphics, Inc., Mountain View, CA (US)

(*) Notice: Subject to any disclaimer, the term of this patent is extended or adjusted under 35 U.S.C. 154(b) by 93 days.

(21) Appl. No.: 10/688,936

(22) Filed: Oct. 21, 2003

(65) Prior Publication Data

US 2004/0080506 A1 Apr. 29, 2004

Related U.S. Application Data

(63) Continuation-in-part of application No. 10/197,845, filed on Jul. 19, 2002, which is a continuation-in-part of application No. 10/197,822, filed on Jul. 19, 2002, now Pat. No. 6,831,642.

(51) Int. Cl.[7] ............................................. G06T 15/00
(52) U.S. Cl. ..................................................... 345/473
(58) Field of Search ................................. 345/473, 474, 345/475, 619; 707/102; 382/282, 285

(56) References Cited

U.S. PATENT DOCUMENTS 6,084,590 A * 7/2000 Robotham et al. .......... 345/419
6,160,907 A * 12/2000 Robotham et al. .......... 382/154

* cited by examiner

Primary Examiner—Phu K. Nguyen
(74) Attorney, Agent, or Firm—Sterne, Kessler, Goldstein & Fox P.L.L.C.

(57) ABSTRACT

Methods and systems for animating with proxy surfaces are provided. A method for animating includes preprocessing an object to form proxy surfaces of part(s) and/or joint(s), and rendering the proxy surfaces to be animated. In an embodiment, preprocessing includes dividing an object to be animated into parts that can move independently without changing shape, forming a proxy surface for each of the parts corresponding to an initial viewing direction, and obtaining a set of view textures for each of the proxy surfaces. Each part proxy surface is then rendered at a new viewing direction. The new viewing direction is function of an object transformation, part transformation, and an initial viewing direction. The object is then animated by repeating the rendering steps. In another embodiment, the object to be animated is divided into parts and at least one joint that can change shape.

14 Claims, 9 Drawing Sheets

Architecture 100

Example 1

SYSTEM AND METHOD FOR IMAGE-BASED RENDERING WITH PROXY SURFACE ANIMATION

CROSS-REFERENCE TO RELATED APPLICATIONS

This application is a Continuation-in-Part of U.S. application Ser. No. 10/197,845, filed Jul. 19, 2002, and this application is also a Continuation-in-Part of U.S. application Ser. No. 10/197,822, filed Jul. 19, 2002, now U.S. Pat. No. 6,831,642; both of which are incorporated herein by reference in their entirety.

BACKGROUND OF THE INVENTION

1. Field of the Invention

The present invention relates to computer graphics including animation.

2. Related Art

A wide variety of applications rely on computer graphics to generate images. An image is made up of an array of picture elements (pixels) and can be displayed on a display unit, such as, a monitor, screen, or cathode ray tube. Images often include graphical representations of objects. Many different types of computing devices with graphics capabilities are used to generate images. Such computing devices use graphics processing. A combination of software, firmware and/or hardware is used to implement graphics processing. For example, graphics processing including rendering can be carried out in a graphics card, graphics subsystem, graphics processor, graphics or rendering pipeline, and/or a graphics application programming interface (API) and libraries, such as OPENGL.

In computer graphics, the geometry of an object is represented by primitives. Common primitives are points, lines, and polygons such as triangles or quads. Each primitive is made up of points called vertices. Each vertex includes information relating to the object and its graphical display as an image. For example, vertex information can include, but is not limited to, vertex coordinates, texture coordinates, an alpha value, and a depth value. Vertex coordinates define the location of a respective vertex in a three-dimensional coordinate space (x,y,z), such as, an object coordinate space or a world coordinate space. In this way, vertex coordinates define the geometry of an object surface. Texture coordinates map to a texture (such as, an image in a two-dimensional texture space (s,t) or a three-dimension texture space (r,s,t)). One way this image (also called a texture) is used in graphics processing is to provide additional surface detail to the object. An alpha value is used to represent transparency information. The depth value is used to define depth information.

Increasing demands are being made upon graphics processing, particularly in the area of animation. These demands include realism, speed and cost. Realistic images are desired to be rendered at real-time, interactive rates while avoiding burdensome graphics processing or hardware requirements. One way to achieve more realism is to use complex objects. Complex objects, however, can involve a large number of primitives. For example, hundred, thousands, or millions of triangles may be needed to represent complex objects. This increases the number of calculations and other processing work required to fully render the object. This complexity is transferred to animation, which basically consists of repetitive object rendering from different camera or viewpoint directions.

Billboard image-based rendering algorithms have been used as an alternative to full rendering of objects. In such a billboard approach object data is rendered as if it were mapped or tiled on a flat plane or "billboard." The billboard approach, however, sacrifices realism and geometry detail. Accordingly, its usefulness is limited to objects viewed from afar unless hundreds of pre-computed texture images are used exceeding the limits of texture hardware. The billboard approach also generally requires many pre-computed texture images. Further, using billboards for an animated object is unreasonable because each frame of the animation would require all the view textures needed for a static object. Not only this would result in a extremely large number of textures that would need to be stored but also would require the animation sequence to be known at the preprocessing step. Others have been using a single view direction, reducing the number of textures, but making it impossible to view the object from more than a single view direction.

One approach to accommodating these demands is to approximate geometric information by forming an object proxy. Conventional approaches to forming an object proxy, however, have been limited. For example, Buehler et al. describes use of geometric proxies based on a progressive hull technique described by Sander et al. See, Buehler et al., "Unstructured Lumigraph Rendering," SIGGRAPH 2001, Los Angeles, Calif., August 2001 (pages 1–8); and Sander et al., "Silhouette Clipping," SIGGRAPH 2000, New Orleans, La., July 2000 (pages 1–8). The progressive hull approach described in the Buehler and Sander articles has significant deficiencies. At the very least, the approach does not apply generally to all types of object shapes. This progressive hull approach cannot handle concave proxies, or objects that have parts close to each other or touching each other. In addition, this approach is not well suited for mixing image-based rendering (ibr) objects with regular scenes. Image based rendering, and thus animation, needs to be improved with a method and system for forming object proxies that can be used with all types of object shapes. Animation at an intermediate level of rendering quality in between full object rendering and a billboard rendering is needed.

SUMMARY OF THE INVENTION

Methods and systems for animating proxy surfaces of parts and/or joints of an object are provided. The present invention overcomes each of the above-identified problems and has additional advantages as described herein. An improved animation solution is provided in which a single, relatively small set of view textures is precomputed and during the rendering these textures are mapped on a proxy surface, a simplified version of the complex object. The animation is achieved by animating the proxy surface itself and selecting the appropriate view textures for each animated part. This provides an efficient approach to real-time rendering of complex objects that are animated. In this way, the present invention leverages the formation of object proxies to provide an intermediate level of rendering quality. This intermediate level of rendering quality is then leveraged to produce realistic animation at real-time interactive rates while avoiding burdensome graphics processing and hardware requirements.

In an embodiment, a method for animating includes preprocessing and rendering stages that operate on parts of an object. The preprocessing stage forms proxy surfaces for parts of the object. Such formation can include dividing an object to be animated into parts. Preferably, the parts can move independently without changing shape in the animation. For each part, a proxy surface is formed at an initial viewing direction, and a set of view textures is obtained. The rendering stage renders the object based on the proxy surfaces. Such rendering can include determining a part transformation with respect to the object, and rendering the proxy surfaces of each part at a new viewing direction. The new viewing direction is determined as a function of an object transformation, the determined part transformation, and an initial selected viewing direction (Ds). In one implementation, a new viewing direction (Dr) is determined as function of an object transformation expressed as a matrix (M1), a part transformation expressed as a matrix (M2), and an initial selected viewing direction (Ds). The object is then animated by repeating the rendering for different viewing directions.

In another embodiment, a method for animating includes pre-processing and rendering stages that operate on part(s) and/or joint(s) of an object. The preprocessing stage forms proxy surfaces for parts and joints of the object. Preferably, the parts can move independently without changing shape in the animation. Joints generally connect parts and can change shape during animation. For each part and each joint, a corresponding proxy surface is formed at an initial viewing direction, and a set of view textures is obtained. The rendering stage renders the object based on the proxy surfaces. The rendering stage can include selecting a viewing direction (Ds) and determining an object transformation. Parts are then rendered by determining a part transformation with respect to the object, and rendering the proxy surfaces of each part at a new viewing direction.

Since joints can change shape, individual primitives of a joint are rendered during the rendering stage. For each primitive of joint, rendering steps include determining a joint primitive transformation with respect to the object, and rendering the proxy surfaces of each part at a new viewing direction. The new viewing direction is determined as function of an object transformation, the determined joint primitive transformation, and an initial selected viewing direction (Ds). In one implementation, a new viewing direction (Dr) is determined as function of an object transformation expressed as a matrix (M1), a joint primitive transformation expressed as a matrix (M3), and an initial selected viewing direction (Ds). The object defined by parts and joints is then animated by repeating the rendering for different viewing directions.

Methods of the present invention can be implemented as control logic in software, firmware, hardware or any combination thereof. These methods can be implemented to run on any computing or processing device having graphics processing capability including, but not limited to, a workstation or personal computer having graphics hardware.

In an embodiment, a system for animating objects includes a preprocessor having a proxy former and a view texture former, and an animator coupled to the preprocessor. The animator has a transformation matrix calculator, a view direction calculator, and an image based renderer. The animator receives object proxies and view textures, from the preprocessor and outputs an animation of the object made up of parts and/or joints.

Further embodiments, features, and advantages of the present inventions, as well as the structure and operation of the various embodiments of the present invention, are described in detail below with reference to the accompanying drawings.

BRIEF DESCRIPTION OF THE FIGURES

The present invention is described with reference to the accompanying figures. In the figures, like reference numbers indicate identical or functionally similar elements. Additionally, the leftmost digit or digits of a reference number identify the figure in which the reference number first appears. The accompanying figures, which are incorporated herein and form part of the specification, illustrate the present invention and, together with the description, further serve to explain the principles of the invention and to enable a person skilled in the relevant art to make and use the invention.

DETAILED DESCRIPTION OF THE INVENTION

Figure 1:
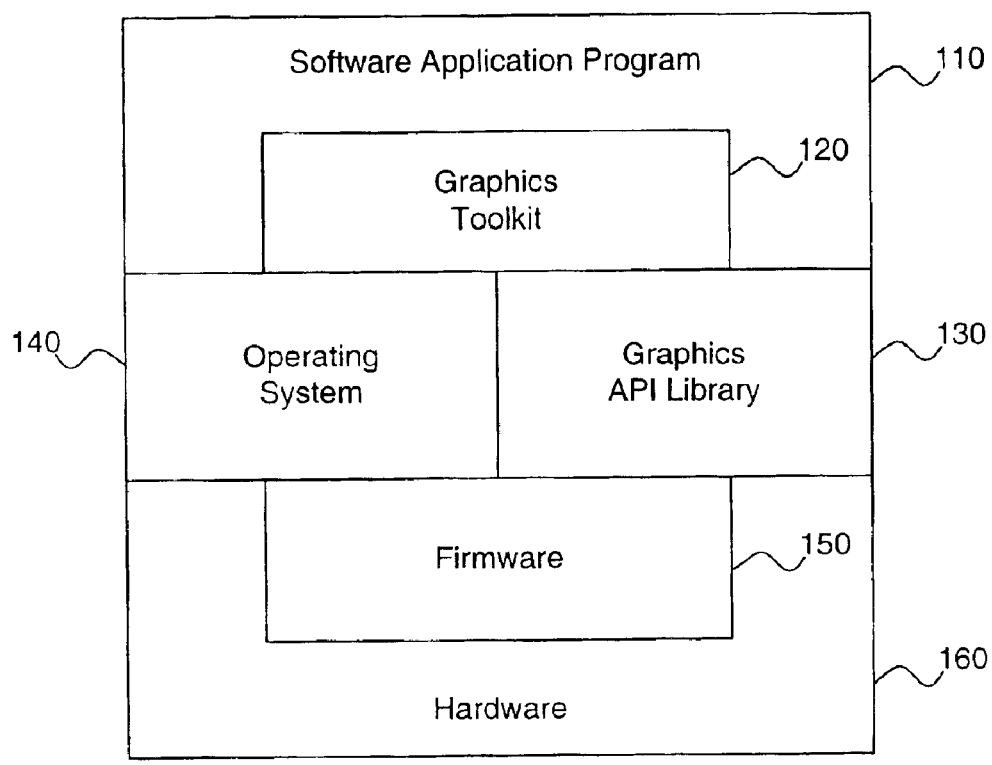
FIG. 1 illustrates a computer architecture in which the present invention can be used.

The present invention leverages two co-pending, commonly-owned applications to disclose a method and system for image based rendering with proxy surface animation. Section I presents terminology used to describe the present invention. Section II summarizes formation of object proxies in accordance with co-pending U.S. application Ser. No. 10/197,822, filed Jul. 19, 2002. Section III summarizes image based rendering using object proxies in accordance with co-pending U.S. application Ser. No. 10/197,845, filed Jul. 19, 2002.

Section IV describes image-based rendering with proxy surface animation according to embodiments of the present invention. First, an architecture in which the present invention may be implemented is described. Second, a system in which the present invention may be implemented is described. Next, two embodiments of a method for proxy surface animation are illustrated and described according to the present invention. Finally, a system according to the present invention is described.

I. Terminology

The following terms are defined so that they may be used to describe embodiments of the present invention. As used herein:

"Pixel" means a data structure, which is used to represent a picture element. Any type of pixel format can be used.

"Real-time" or "Interactive Rate" refers to a rate at which successive display images can be redrawn without undue delay upon a user or application. This can include, but is not limited to, a nominal rate of between 30–60 frames/second. In some example embodiments, such as some flight simulators or some interactive computer games, an interactive rate may be approximately 10 frames/second. In some examples, real-time can be one update per second. These examples are illustrative of real-time rates; in general, smaller or larger rates may be considered "real-time" depending upon a particular use or application.

"Texture" refers to image data or other type of data that can be mapped to an object to provide additional surface detail or other effects. In computer graphics applications, texture is often a data structure including but not limited to an array of texels. A texel can include, but is not limited to, a color value or an intensity value. These texel values are used in rendering to determine a value for a pixel. As used herein, the term "texture" includes, for example, texture maps, bump maps, and gloss maps.

"Texture sample" refers to a sample selected from a texture map or texture. The sample can represent one texel value or can be formed from two or more texel values blended together. Different weighting factors can be used for each texel blended together to form a texel. The terms "texel" and "texture sample" are sometimes used interchangeably.

"Texture unit" refers to graphics hardware, firmware, and/or software that can be used to obtain a texture sample (e.g., a point sample or a filtered texture sample) from a texture. A texture unit can in some embodiments obtain multiple texture samples from multiple textures.

II. Method and System for Forming an Object Proxy

An object proxy approximates the geometry of an object. A method and system for forming an object proxy is disclosed in co-pending U.S. application Ser. No. 10/197,822, filed Jul. 19, 2002, which is hereby incorporated by reference in its entirety. The method includes forming a volume that encompasses the object, forming an isosurface within the volume, adjusting the isosurface relative to a surface of the object, and pruning the isosurface to obtain the object proxy. The formed volume is made up of voxels that encompass the object. The isosurface forming step includes determining sets of vertices for the voxels such that the sets of vertices define polygons representing the isosurface at a first distance from the surface of the object.

According to a feature of the method, the isosurface adjusting step includes adjusting at least some of the vertices of the isosurface until each vertex is at or near a second distance from the surface of the object. In an example, each vertex is iteratively advanced by an amount based on a first distance, a second distance, and direction information.

According to a further feature, the isosurface pruning step includes pruning the isosurface based on a distance condition and an intersection condition. In an example, a list of vertices of the isosurface is iteratively pruned. This pruning includes selecting a vertex, and determining whether the selected vertex can be eliminated from the isosurface based on a distance condition and an intersection condition. When a selected vertex can be eliminated, the vertex is eliminated and new edges are created using remaining vertices.

Another feature of the method includes a step of iteratively moving vertices in the initial object proxy closer to the surface of the object. In one example, after pruning to obtain an initial object proxy, the distance of a respective vertex to the object surface is computed. Each vertex of the initial object proxy is advanced toward the object surface until each vertex is on or near the object surface with no polygons deeper than a predetermined distance or until a predetermined number of iterations has been reached.

According to further feature, object proxy formation parameters can be user-specified and/or predetermined. These object proxy formation parameters include: a grid resolution (N1×N2×N3) representing the resolution of voxels in a volume, a first distance value (D1) representing the first distance between an initial isosurface and the object surface, a second distance value (D2) representing the distance between an initial object proxy obtained after pruning and the object surface, a third distance value (D3) representing the maximum allowed distance between a vertice in the isosurface and the object surface during pruning, and a fourth distance value (D4) representing a maximum depth for vertices from the object surface.

The apparatus for forming an object proxy that approximates the geometry of an object includes an isosurface former that forms an isosurface within a volume encompassing an object, and an isosurface shaper that adjusts the isosurface relative to the surface of the object and prunes the isosurface to obtain the object proxy.

Another advantage of the above summarized method is that it allows object formation parameters to be user-specified (or set by default) so that the degree in which the isosurface shape approximates the original object surface can be adjusted depending upon a particular application or need. Forming object proxies according to method summarized above also make it possible both to render more image-based objects in a single computer generated scene and to render these image-based objects using fewer views/textures than conventional image-based rendering and animation schemes.

Forming an object proxy has a general application in that it can be used to form object proxies for all types of object shapes. Approximating object geometries reduces the processing work required at run-time. For example, the object proxy can have less polygons and associated vertices than the original object. In this way, rendering and animation of the object based on the object proxy can be carried out for display or animation in real-time at an interactive rate even on cheaper graphics hardware. Compared to a general mesh simplification algorithm, object proxies formed according to the method summarized above, and disclosed in U.S. application Ser. No. 10/197,822, filed Jul. 19, 2002, are assured to have no or minimal interaction with an object, which is especially advantageous in hardware-accelerated image-based rendering and animation.

III. Method and System for Image Based Rendering with Object Proxies

A method for image based rendering is disclosed in co-pending U.S. application Ser. No. 10/197,845, filed Jul. 19, 2002, and is hereby incorporated by reference. The method includes the steps of: forming a set of view textures corresponding to a set of viewing directions; selecting a viewing direction for rendering; selecting at least two view textures from the formed set based on the selected viewing direction; and rendering the object proxy at the selected viewing direction. The rendering step includes applying texture from the selected view textures onto the selected object proxy. This rendering can include, but is not limited to, image-based rendering. Multiple object proxies can be used. One or more objects can be rendered in a single scene or frame for display or animation, or other applications.

According to one feature, a pre-computed view texture is a texture according to the invention that contains view information for an associated pre-computed object proxy. Preferably, a view texture according to the invention comprises a pre-rendered full view image of an object of interest and pre-rendered extra texture patches associated with partially obstructed or fully obstructed polygons of the object proxy. This view information is used during rendering to draw the object of interest in a scene. A pre-computed object proxy is a simplification of an object boundary or contour.

The view texture set forming step includes: calculating texture coordinates for the object proxy based on the level of obstruction at different portions of the object proxy and texture packing data; and drawing portions of the object based on the level of obstruction data for the object proxy and based on the texture packing data to obtain a view texture at the selected viewing direction.

In one example, this drawing step includes: (i) drawing the portions of the object that correspond to unobstructed front-facing portions of the object proxy with additional displacement based on corresponding texture packing data; (ii) drawing the portions of the object that correspond to at least partially obstructed front-facing portions of the object proxy with additional displacement based on corresponding texture packing data and removal of any intervening object portions; and (iii) drawing the portions of the object that correspond to back-facing portions of the object proxy that are visible from nearby viewing directions with additional displacement based on corresponding texture packing data and removal of intervening object portions, whereby a view texture having texture patches can be obtained.

A view texture set forming step includes: (i) selecting a particular viewing direction from a set of viewing directions; (ii) determining level of obstruction data for each polygon of an object proxy; (iii) storing the level of obstruction data; (iv) for each polygon, determining whether the polygon is visible from the selected particular viewing direction and whether texture should be applied from a neighboring viewing direction; (v) determining texture packing data; and (vi) storing the texture packing data. The view texture set forming step further includes (vii) adjusting texture coordinates of each polygon for the selected particular viewing direction based on said determining step (iv) and said texture packing data.

Any type of texture packing technique and data can be used. For example, the texture packing data can comprise shift and rotation data relative to a viewing direction which is used in a texture packing algorithm to create texture patches.

The method can also include storing the object proxy together with a set of texture coordinates for each viewing direction of the set of viewing directions. Alternatively, the method can include forming groups of viewing directions, and storing a modified object proxy together with a set of texture coordinates for each group of viewing directions.

A system for rendering an object proxy includes a view texture former and a renderer. The view texture former forms a set of view textures corresponding to a set of viewing directions. The renderer renders the object proxy at a viewing direction with texture applied from view textures selected from the set of view textures.

In one example, the view texture former includes an object proxy texture coordinate calculator and a drawer. The object proxy texture coordinate calculator calculates texture coordinates for the object proxy based on the level of obstruction at different portions of the object proxy and based on texture packing data. The drawer draws portions of the object based on the level of obstruction data for the object proxy and based on the texture packing data to obtain a view texture at a respective viewing direction. Further, in one example implementation a drawer is provided that draws the portions of the object that correspond to unobstructed front-facing portions of the object proxy with additional displacement based on corresponding texture packing data, draws the portions of the object that correspond to at least partially obstructed front-facing portions of the object proxy with additional displacement based on corresponding texture packing data and removal of any intervening object portions, and draws the portions of the object that correspond to back-facing portions of the object proxy that are visible from nearby viewing directions with additional displacement based on corresponding texture packing data and removal of intervening object portions, whereby a view texture having texture patches can be obtained.

The method provides level of detail rendering and a method for creating a level of detail rendering node. In an embodiment, a level of detail rendering node is created by combining three node components. A first node component includes an object and at least one texture. This first node component is used to draw an image of the object at a first level of detail having high resolution. Typically, the first node component is used to draw images of the object that are close to a viewer of a scene. A second node component includes an object proxy and a plurality of view textures. The object proxy approximates the geometry of the object. The second node component is used to draw the image of the object at a second level of detail having intermediate resolution. A third node component includes a billboard with several small views. The third node component is used to draw the image of the object at a third level of detail having low resolution. Typically, the third node component is used to draw images of the object that are far from the viewer. During rendering, the first node component, the second node component, or the node component of the level of detail node is selected and used to draw the image of the object based on an input distance. Preferably, the input distance is the distance between the image of the object and the viewer.

Rendering based on the use of object proxies as disclosed in co-pending U.S. application Ser. No. 10/197,845, filed Jul. 19, 2002, and summarized above, has advantages. First, such rendering with the use of object proxies is faster and less expensive than fully rendering objects based on object geometry data. This is especially true for complex objects with large numbers of polygons. Additionally, rendering with the use of object proxies provides more surface detail and realism than conventional approaches that render to a billboard. In this way, rendering of one or more objects based on their object proxies can be carried out for display or animation in real-time at an interactive rate even on cheaper graphics hardware.

IV. Image Based Rendering with Proxy Surface Animation

The present invention leverages the above summarized methods for (i) forming object proxies and (ii) image based rendering with object proxies in order to achieve realistic animation, rendered in real-time, at increased speed and reduced cost.

EXAMPLE ARCHITECTURE OF THE INVENTION

FIG. 1 illustrates a block diagram of an example computer architecture 100 in which the various features of the present invention can be implemented. This example architecture 100 is illustrative and not intended to limit the present invention. It is an advantage of the invention that it may be implemented in many different ways, in many environments, and on many different computers or computer systems.

Architecture 100 includes six overlapping layers. Layer 110 represents a high level software application program. Layer 120 represents a three-dimensional (3D) graphics software tool kit, such as OPENGL PERFORMER. Layer 130 represents a graphics application programming interface (API), which can include but is not limited to OPENGL, available from Silicon Graphics, Incorporated. Layer 140 represents system support such as operating system and/or windowing system support. Layer 150 represents firmware. Finally, layer 160 represents hardware, including graphics hardware. Hardware 160 can be any hardware or graphics hardware including, but not limited to, a computer graphics processor (single chip or multiple chip), a specially designed computer, an interactive graphics machine, a gaming platform, a low end game system, a game console, a network architecture, et cetera. Some or all of the layers 110–160 of architecture 100 will be available in most commercially available computers.

As will be apparent to a person skilled in the relevant art after reading the description of the invention herein, various features of the invention can be implemented in any one of the layers 110–160 of architecture 100, or in any combination of layers 110–160 of architecture 100.

EXAMPLE SYSTEM EMBODIMENT OF THE PRESENT INVENTION

Figure 2:
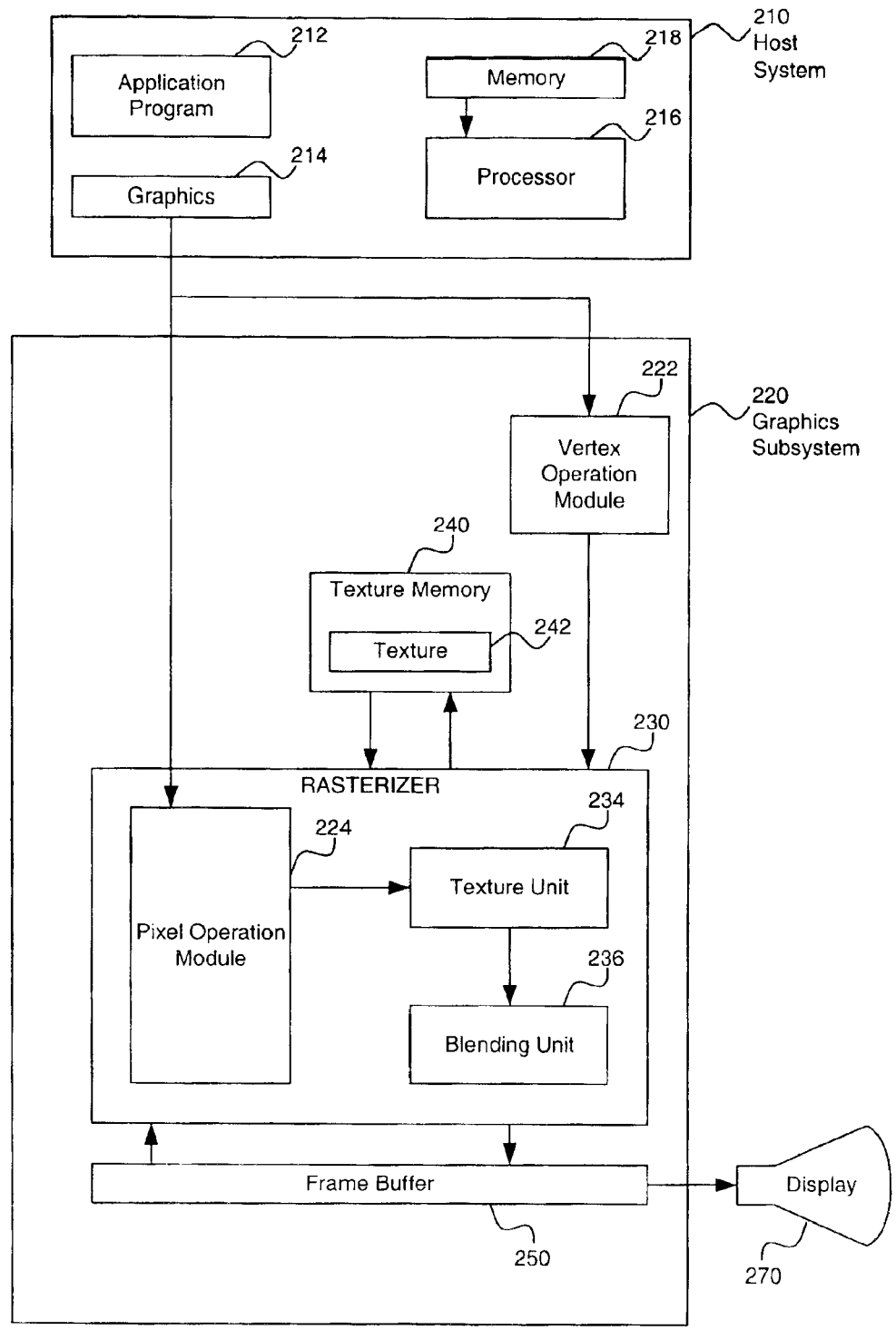
FIG. 2 illustrates a system to support the present invention.

FIG. 2 illustrates an example graphics system 200 according to an embodiment of the present invention. Graphics system 200 comprises a host system 210, a graphics subsystem 220, and a display 270. Each of these features of graphics system 200 is further described below.

Host system 210 comprises an application program 212, a hardware interface or graphics API 214, a processor 216, and a memory 218. Application program 212 can be any program requiring the rendering of a computer image. The computer code of application program 212 is executed by processor 216. Application program 212 assesses the features of graphics subsystem 220 and display 270 through hardware interface or graphics API 214. Memory 218 stores information used by application program 212.

Graphics subsystem 220 comprises a vertex operation module 222, a rasterizer 230, a texture memory 240, and a frame buffer 250. Texture memory 240 can store one or more textures or images, such as texture 242. Texture memory 240 is connected to a texture unit 234 by a bus (not shown). Rasterizer 230 comprises a pixel operation module 224, a texture unit 234 and a blending unit 236. Texture unit 234 and blending unit 236 can be implemented separately or together as part of a graphics processor. The operation of these features of graphics system 200 would be known to a person skilled in the relevant art given the description herein.

In embodiments of the present invention, texture unit 234 can obtain multiple point samples or multiple filtered texture samples from textures and/or images stored in texture memory 240. Blending unit 236 blends texels and/or pixel values according to weighting values to produce a single texel or pixel. The output of texture unit 234 and/or blending unit 236 is stored in frame buffer 250. Display 270 can be used to display images stored in frame buffer 250.

The embodiment of the invention shown in FIG. 2 has a multipass graphics pipeline. It is capable of operating on each pixel of an image (object) during each pass that the image makes through the graphics pipeline. For each pixel of the image, during each pass that the image makes through the graphics pipeline, texture unit 234 can obtain at least one texture sample from the textures and/or data stored in texture memory 240. Although the embodiment of the invention shown in FIG. 2 has a multipass graphics pipeline, it is noted here that other embodiments of the invention do not have a multipass graphics pipeline. As described below, method embodiments of the invention can be implemented using systems that do not have a multipass graphics pipeline.

EXAMPLE METHOD EMBODIMENTS OF THE PRESENT INVENTION

Figure 3A:
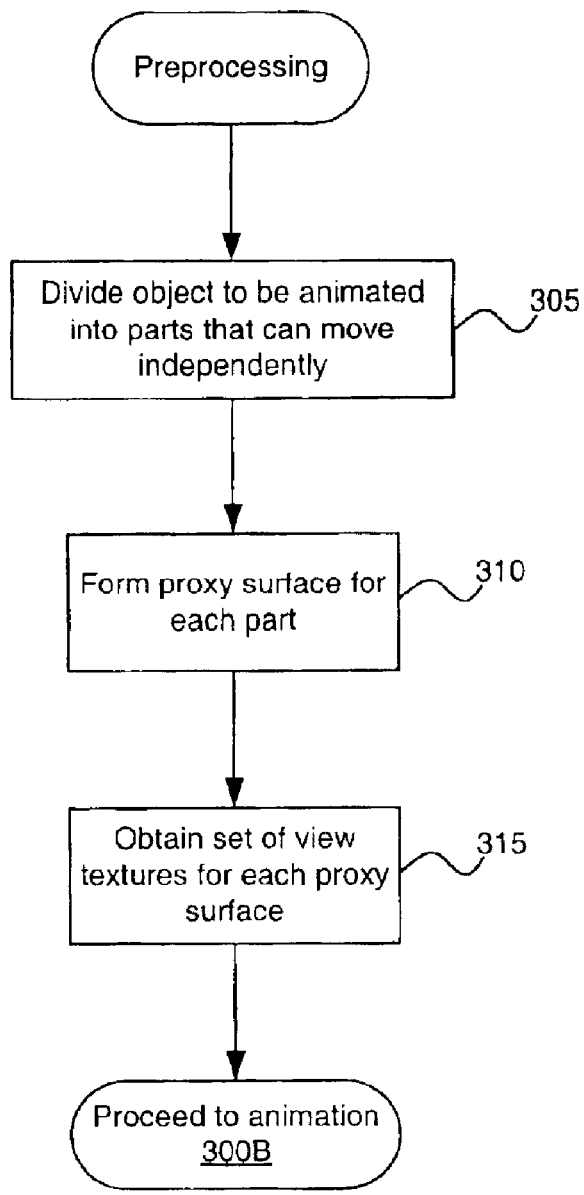
FIGS. 3A and 3B illustrate a method for proxy surface animation according to an embodiment of the invention.
Figure 3B:
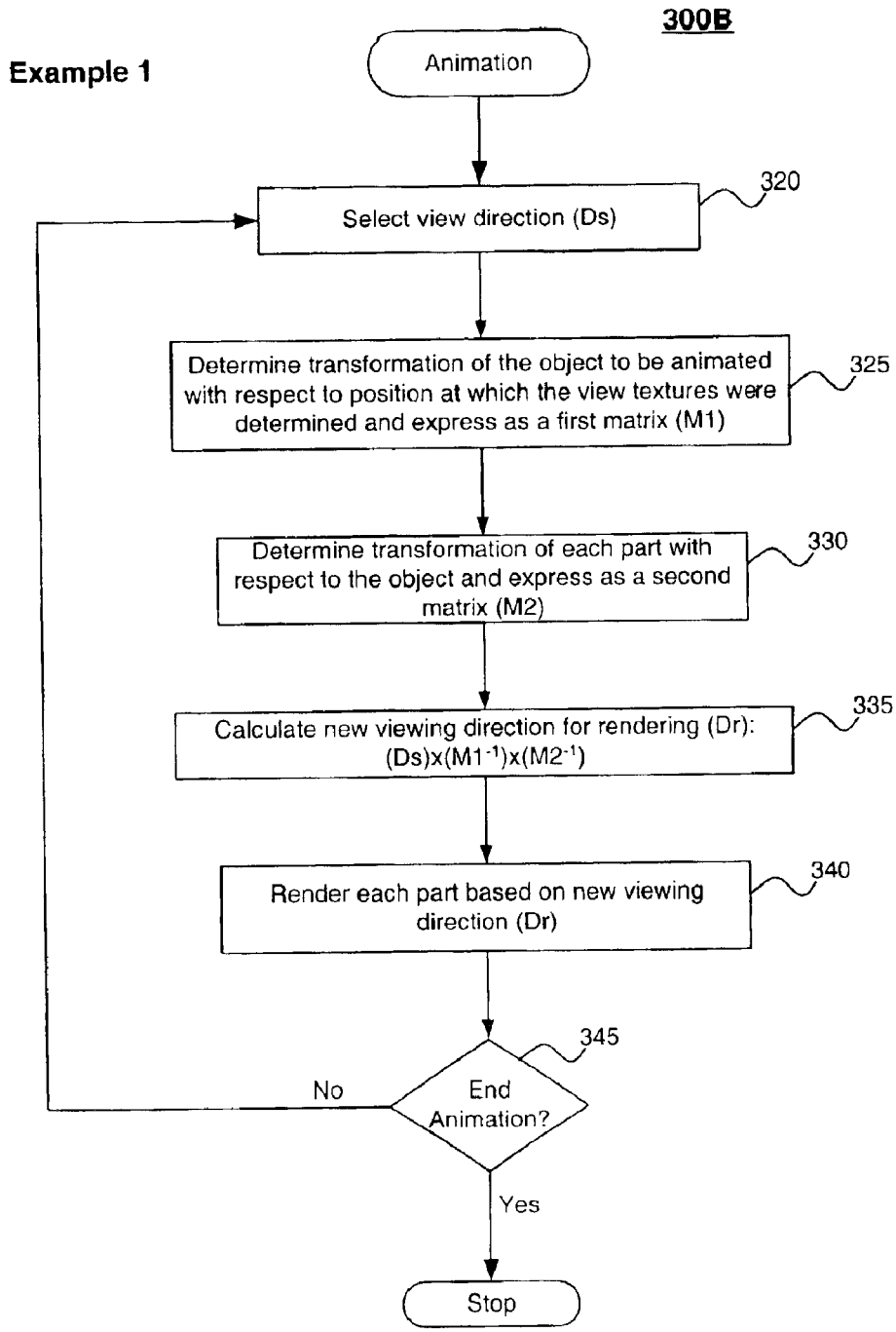

FIGS. 3A and 3B illustrate a flowchart of a method for image based rendering with proxy surface animation according to an embodiment of the invention. The method includes a preprocessing stage 300A, illustrated by the flow chart of FIG. 3A, and an animation stage 300B, illustrated by the flow chart of FIG. 3B.

Figure 4A:
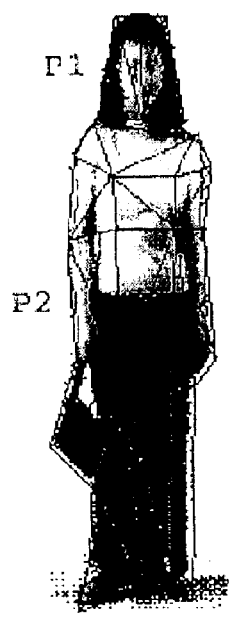
FIGS. 4A and 4B illustrate an example of proxy surface animation according the method of FIGS. 3A and 3B.

In an embodiment, preprocessing stage 300A operates as follows. An object to be animated is divided into parts. Parts can be generally defined as portions of an object of interest that can move independently with respect to the object without changing shape. Next, a proxy surface is formed for each part. For each proxy surface, a set of view textures is obtained. The method then proceeds to the animation stage 300B. As illustrated in FIG. 3A, method 300 comprises steps 305, 310 and 315. Each of these steps will now be described in further detail with reference to the flowchart of FIG. 3A and an example object in FIGS. 4A–4B.

Figure 4B:
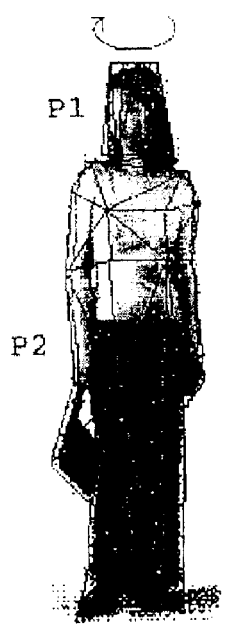

In step 305, the object to be animated is divided into parts that can move independently of each other. For example, referring to FIG. 4A, an object 400 representing a person divided into two parts that can move independently, such as the head P1, and the remainder of the body P2. As shown in FIG. 4B, the head P1 is able to move—e.g., rotate—independently of the remainder of the body P2.

In step 310, a proxy surface is formed for each part P1, P2. As noted above, an object proxy is a simplification of an object boundary that is useful for hardware-accelerated image-based rendering. Step 310 leverages the object proxy forming method summarized above in Section II, and disclosed in further detail in co-pending U.S. application Ser. No. 10/197,822, filed Jul. 19, 2002, which has been incorporated by reference in its entirety. The invention, however, is not limited to this embodiment. Other methods can also be used to form object proxies that can be used in accordance with the present invention.

In step 315, a set of view textures is obtained for each proxy surface. The formation of view textures is summarized above in Section III above and disclosed in further detail in co-pending U.S. application Ser. No. 10/197,845, filed Jul. 19, 2002. View textures are formed using a set of viewing directions. A viewing direction is the direction from which the object will appear to be seen by a viewer after it is drawn or rendered. The direction at which a particular view texture is initially calculated (Di) becomes the baseline for the animation stage 300B, which is discussed in more detail below. Once the view textures have been obtained for each proxy surface, the method for image based rendering with proxy surface animation proceeds to the animation stage 300B.

As shown in FIG. 3B, a viewing direction (Ds) is selected (step 320). The particular view direction selected will depend on the circumstances of the desired animation. This is because the animation fundamentally consists of repeatedly rendering the object to be animated from an incrementally changing set of view directions. Thus, any detected change in the desired geometry of an object will result in a new viewing direction. Whether or not a new view is selected thus depends on the current animation application program and whether the object of interest in a scene is in motion.

In step 325, the transformation of the entire object to be animated ("object transformation") is determined with respect to the position at which the view textures were determined. In other words, the entire object at the selected view direction Ds is quantitatively compared to the entire object at the direction (Di) at which the view textures were initially calculated. This comparison is used to determine an appropriate transformation. The transformation can include rotation, translation and/or scaling, and combined into a transformation matrix (M1). M1 thus represents the degree to which the entire object has moved with respect to its original position. For example, the woman shown in FIG. 4 could be standing on an escalator. While the two parts described above—head (P1) and remainder of body (P2)—may be static with respect to each other, the entire body may have changed positions within the scene. Matrix M1 represents this change.

In step 330, the transformation of each part ("part transformation")—the part being represented by a proxy—is determined with respect to the entire object at the selected viewing direction. As with step 325, the part transformation is done for rotation, translation and/or scaling, and combined into a part transformation matrix (M2). M2 thus represents the degree to which the individual parts have moved with respect to the object at its original position. Using the preceding example of the woman 400 of FIG. 4 standing on an escalator, the animation may show her rotating her head as she passes an attractive graphics programmer or patent attorney on the opposite escalator. This would cause her head (P1) to move with respect to the rest of the body (P2). For P1, matrix M2 would represent this change.

In step 335, a new viewing direction for rendering (Dr) is calculated. The new rendering viewing direction (Dr) is a function of the selected viewing direction (Ds), the object transformation matrix ($M1^{-1}$), and the part transformation matrix ($M2^{-1}$). In one implementation, the new rendering viewing direction (Dr) is equal to the selected viewing direction (Ds) multiplied by an inverse of matrix ($M1^{-1}$) and an inverse of the matrix ($M2^{-1}$). In other words: $Dr=Ds \times M1^{-1} \times M2^{-1}$. Each part is rendered at the new viewing direction Dr. According to step 345, rendering steps 320 through 340 are repeated for animation as long as the object of interest in the scene remains in motion.

The above described embodiment works well for animation of an object whose parts behave independently—such as the turning of a head on a body. Another example might be the wheels on a car, which can also move independently of the car. A more complicated animation scenario arises where there is more dependency between the individual parts of an object and the object itself—for example at a joint. Where an arm is moved up and down, certain portions of the shoulder joint will be displaced at different times and at different rate than other portion of the joint, depending on the particulars of the movement.

Recall from above that parts can be generally defined as portions of an object of interest that can move independently with respect to the object without changing shape. A joint can be generally defined as a portion of the object of interest that connects two or more parts, where the joint changes shape as the parts to which it is connected are displaced. For instance, a joint may be stretched or compressed as the parts to which it is connected are displaced. An embodiment of the invention, described next, provides a method for animation of proxy surfaces that are connected by a joint.

Figure 5A:
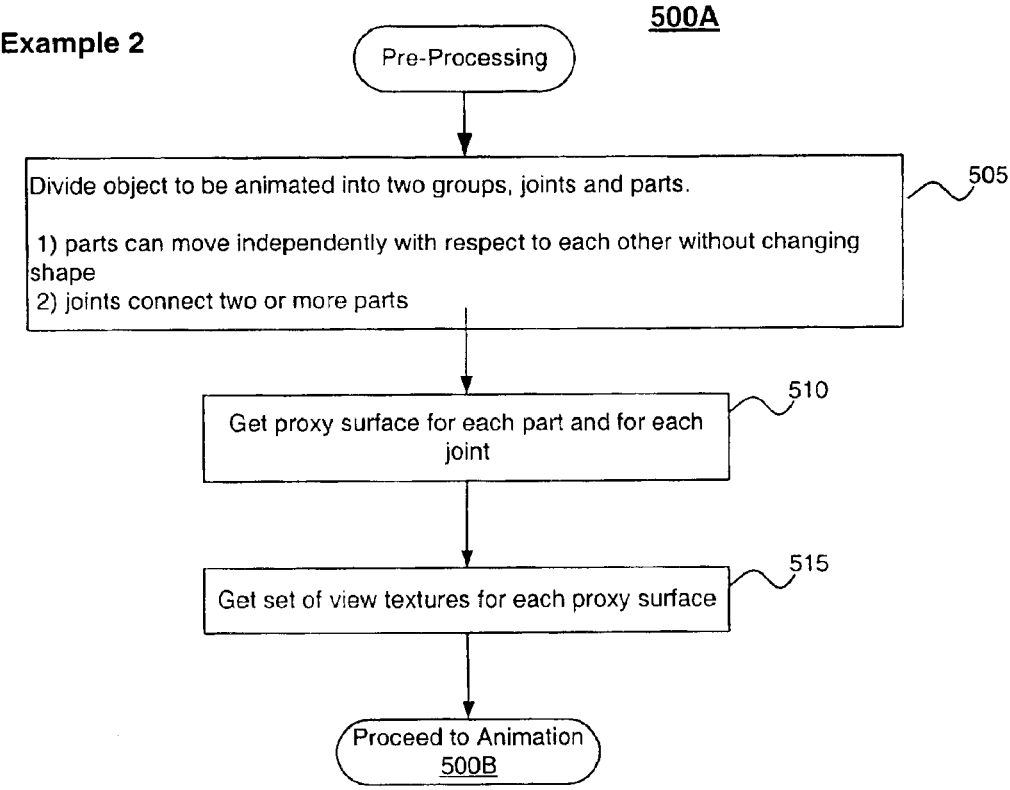
FIGS. 5A and 5B illustrate a method of proxy surface animation according to an alternate embodiment of the invention.
Figure 5B:
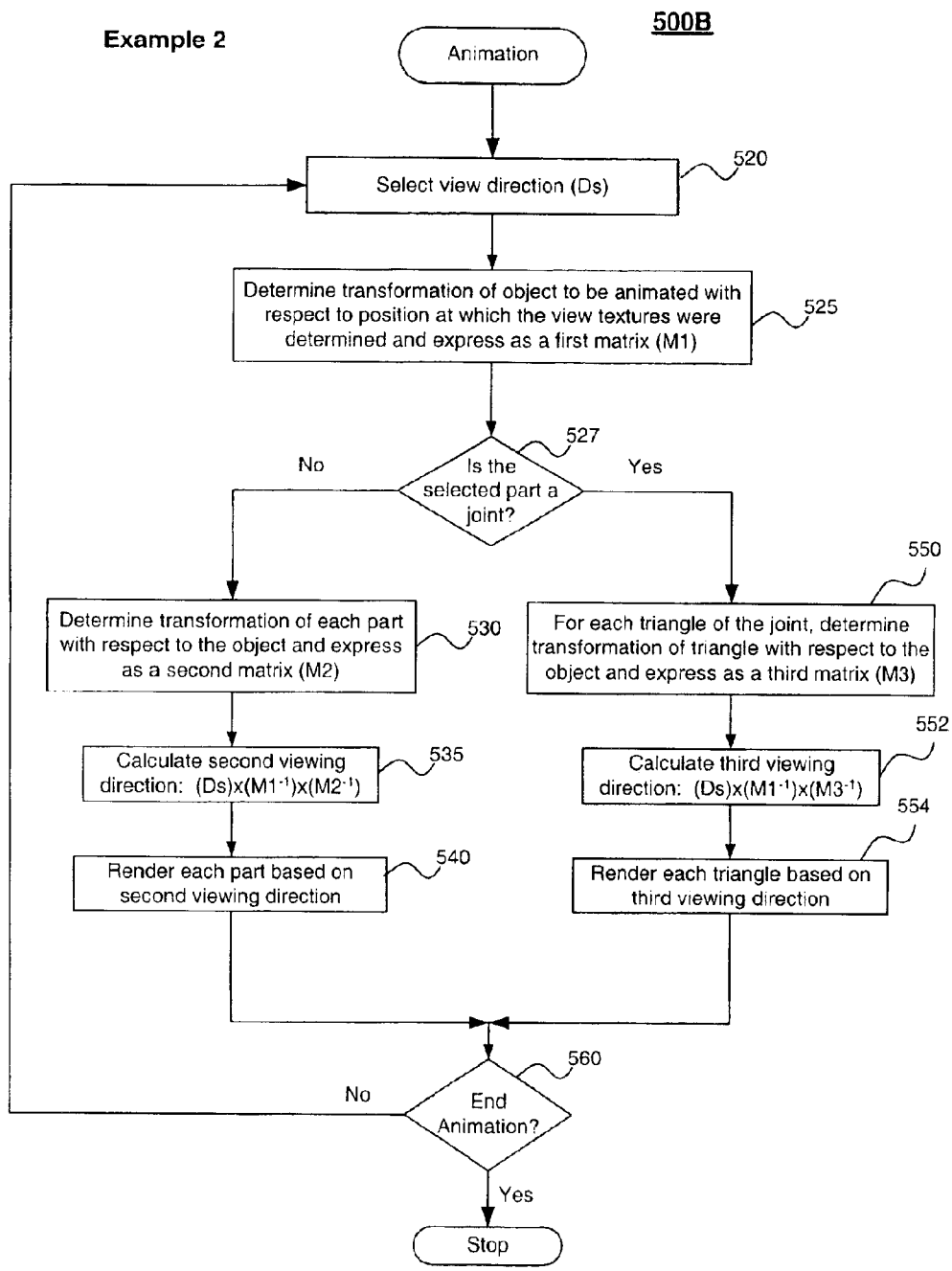

FIGS. 5A and 5B illustrate a method for image based rendering with proxy surface animation that accounts for joints, thereby providing more realistic animation for more complicated objects. Like the embodiment described above, the method includes a preprocessing stage 500A, illustrated by the flow chart of FIG. 5A, and an animation stage 500B, illustrated by the flow chart of FIG. 5B.

In an embodiment, preprocessing stage 500A operates as follows. An object to be animated is divided into parts and joints, as described above. Next, a proxy surface is formed for each part and for each joint. For each proxy surface, a set of view textures is obtained. The method then proceeds to the animation stage 500B where part and joint transformations are determined, a new viewing direction is calculated, and the proxy surfaces a rendered. As illustrated in FIG. 5A, method 500 comprises steps 505, 510 and 515. Each of these steps will now be described in further detail with reference to the flowchart of FIG. 5A and the example illustrated in FIGS. 6A and 6B.

In step 505, the object to be animated is divided into at least two parts that can move independently with respect to the object without changing shape. This step is similar to step 305 described above. Next, in step 507, joints are defined that connect at least two parts of the object. The joints, as described above, are capable of changing shape when the parts connected to it are displaced. Each joint is comprised of a plurality of triangles, the number of triangles depending on the complexity of the joint.

Figure 6A:
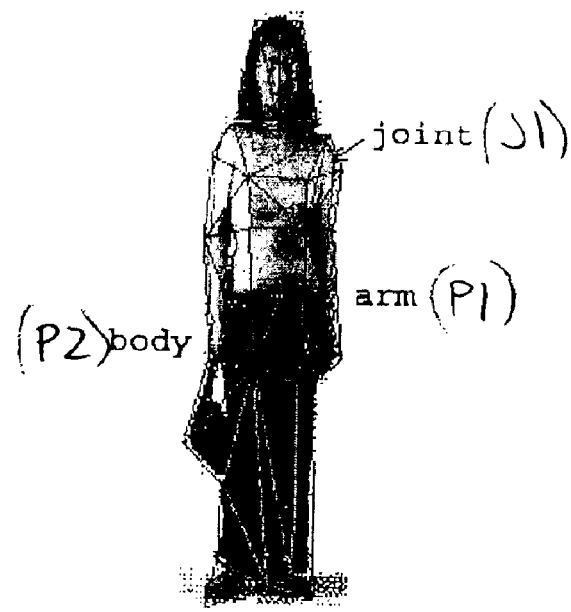
FIGS. 6A and 6B illustrate an example of proxy surface animation according the method of FIGS. 5A and 5B.
Figure 6B:
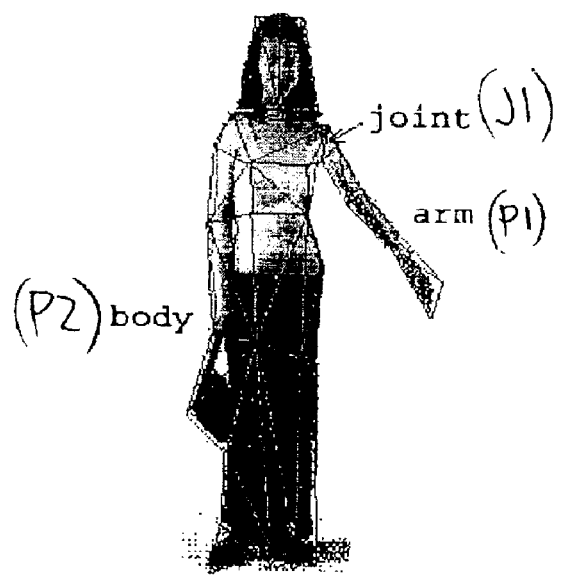

For example, referring to FIG. 6A, an object 600 representing a person divided into two parts that can move independently, such as an arm P1 and body P2. As shown in FIG. 6B, the arm P1 is able to move—e.g., be raised—independently of the remainder of the body P2. In addition to the two parts, a joint J1 is defined. Joint J1 connects the arm P1 and the body P2. Joint J1 represents a shoulder joint. It will be appreciated that to achieve realistic animation, the shoulder joint would be stretched or compressed depending on the motion characteristics of the arm as well as the direction from the motion of the arm is observed.

In step 510, a proxy surface is formed for each part and for each joint. As noted above, an object proxy is a simplification of an object boundary that is useful for hardware-accelerated image-based rendering. Step 510 leverages the object proxy forming method summarized above in Section II, and disclosed in co-pending U.S. application Ser. No. 10/197,822, filed Jul. 19, 2002, which has been incorporated by reference in its entirety. The invention, however, is not limited to this embodiment. Other methods can also be used to form object proxies that can be used in accordance with the present invention.

In step 515, a set of view textures is obtained for each proxy surface. This step is essentially the same as step 315 above. The formation of view textures is summarized above in Section III above and disclosed in further detail in co-pending U.S. application Ser. No. 10/197,845, filed Jul. 19, 2002. View textures are formed using a set of viewing directions. As used herein, viewing direction means the direction from which the object will appear to be seen by a viewer after it is drawn or rendered. The direction at which a particular view texture is initially calculated (Di) becomes the baseline for the animation stage 500B, which is discussed in more detail below. Once the view textures have been obtained for each proxy surface, the method for image based rendering with proxy surface animation proceeds to the animation stage 500B, illustrated in FIG. 5B.

Animation stage 500B differs from animation stage 300B only in the fact that the transformation of a joint is determined differently. In step 520, a viewing direction (Ds) is selected. In step 525, a transformation matrix M1 is determined. Therefore, steps 520 and 525 are similar to steps 320 and 325. These steps 520 and 525 determine the transformation of the entire object for use in determining the transformation of the individual parts and joints represented in a first transformation matrix M1.

According to step 527, a decision is made as to whether a part or a joint is to be rendered. If a part is to be rendered, then steps 530, 535 and 540 of FIG. 5B proceed the same way as corresponding steps 330, 335 and 340 in FIG. 3B.

Steps 530 thus results in a part transformation represented by a second matrix M2, step 535 calculates a second viewing direction for the part, and step 540 renders the part using the view textures and the second viewing direction.

However, if a joint is to be rendered, a slightly different procedure is followed. This is because, as described above, a joint is comprised of a plurality of triangles and may be stretched or compressed depending on the motion characteristics of the parts to which the joint connects. FIG. 6B shows an example of a joint J1 when arm P1 is outstretched from body P2. In FIG. 6B, joint J1 changes its shape compared to joint J1 shown in FIG. 6A. For a joint, according to step 550, the transformation is determined for each of the plurality of triangles of the proxy surface representing the joint with respect to the object. This joint transformation is represented by a third matrix (M3). According to step 552, matrix M3 is used to calculate a third viewing direction. Finally, according to step 554, the third viewing direction is used to render the proxy surface representing the joint on a triangle by triangle basis. It will be appreciated that by rendering the joint on a triangle by triangle basis, a more realistic animation can be produced for the joint area.

According to step 560, animation method 500B is repeated as long as the object of interest in the scene remains in motion, as determined by the particular application. In sum, the method described in FIGS. 5A and 5B is similar to the method described in FIGS. 3A and 3B. The primary difference is the identification and treatment of the portions of the object of interest that join two separate parts—joints. Therefore, the embodiment described with respect to FIGS. 5A and 5B, still gains the benefits of proxy surface animation while providing for more realistic animation for complex motion characteristics of joints.

EXAMPLE SYSTEM EMBODIMENT OF THE PRESENT INVENTION

Figure 7:
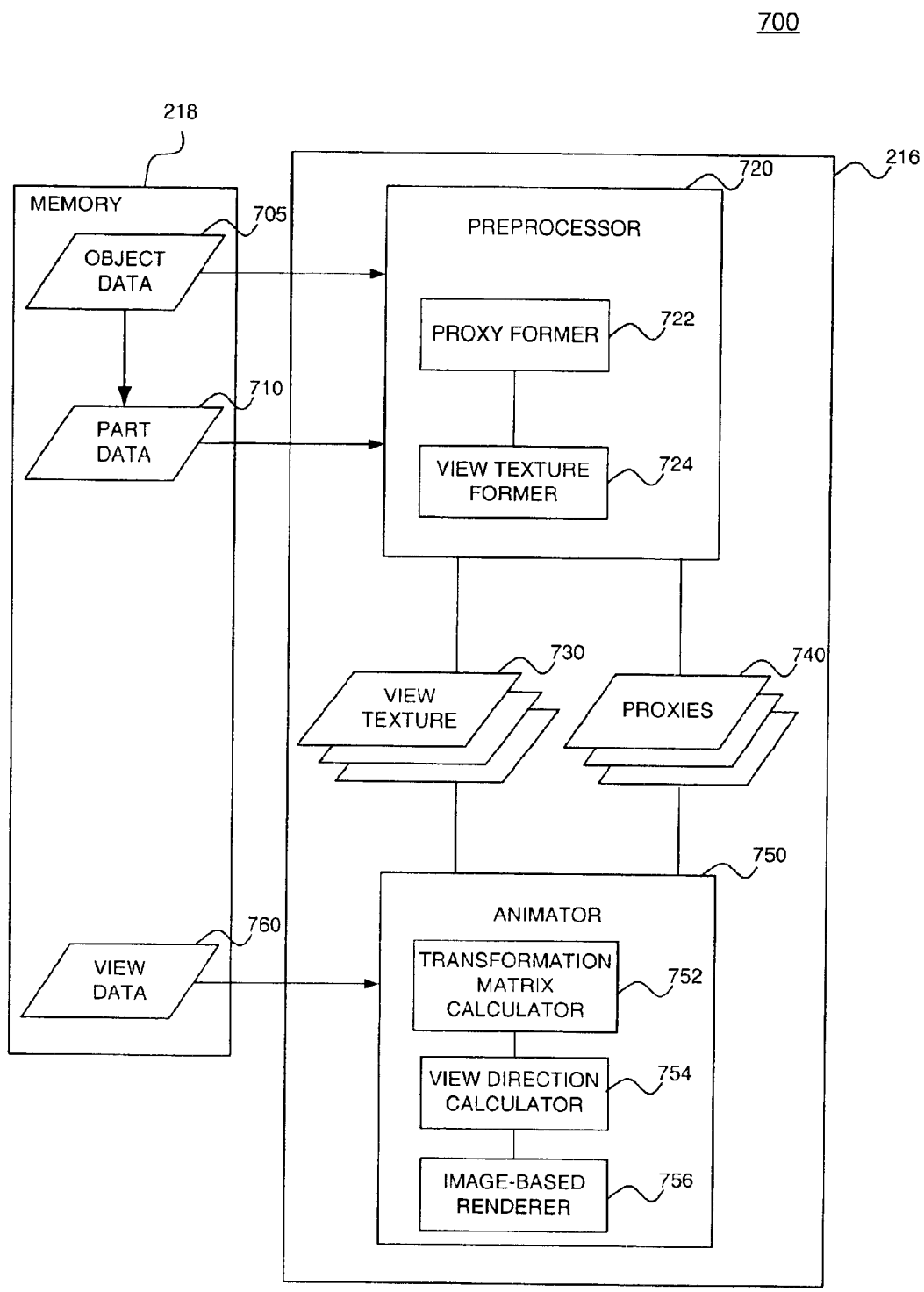
FIG. 7 illustrates a graphics system that includes a pre-processing stage and an animation stage.

FIG. 7 shows a graphics system 700 for carrying out methods 300 and 500 according to the present invention. System 700 includes a memory 718, a preprocessor 720 and an animator 750. Preprocessor 720 and an animator 750 both reside in or are executed by processor 716 of a host system (not shown). Processor 716 is communicatively coupled to memory 718, which also resides in the host system. Memory 718 includes object data 705, part data 710, and view data 760.

Preprocessor 720 includes a proxy former 722 and a view texture former 724. View textures 730 and proxies 740 are passed to animator 750. Animator 750 includes a transformation matrix calculator 752, a view direction calculator 754, and an image based renderer 756.

The formation of object proxies by proxy former 722 and the formation of view textures by view texture former 724 are summarized above and disclosed in disclosed in further detail in co-pending U.S. application Ser. No. 10/197,822, filed Jul. 19, 2002, which has been incorporated by reference in its entirety. The transformation of part and joint proxies as proxy surface animation proceeds according to the above-described methods is carried out in the transformation matrix calculator 752. View direction calculator 756 calculates view directions according to the above-described methods. Vertices that form the part and joint proxies, texture coordinates for each vertex, and blending weights are all outputs of image based rendering as disclosed in detail in co-pending U.S. application Ser. No. 10/197,845, filed Jul. 19, 2002, which has been incorporated by reference in its entirety.

CONCLUSION

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

Various embodiments of the present invention have been described above, which are capable of being implemented on an interactive graphics machine. It should be understood that these embodiments have been presented by way of example only, and not limitation. It will be understood by those skilled in the relevant art that various changes in form and details of the embodiments described above may be made without departing from the spirit and scope of the present invention as defined in the claims. Thus, the breadth and scope of the present invention should not be limited by any of the above-described exemplary embodiments, but should be defined only in accordance with the following claims and their equivalents.

What is claimed is:

1. A method for animating an object, comprising:
   (a) preprocessing the object to be animated including forming proxy surfaces for parts of the object; and
   (b) rendering the proxy surfaces including:
      (i) determining a transformation of each part with respect to the object; and
      (ii) rendering the proxy surfaces of each part at a new viewing direction based on the determined part transformation, whereby, steps (b)(i) and (b)(ii) can be repeated to animate the object at successive new viewing directions.

2. The method of claim 1, wherein said pre-processing step (a) comprises:
   dividing said object to be animated into at least two parts that can move independently with respect to said object without changing shape;
   forming a proxy surface for each of said parts corresponding to an initial viewing direction; and
   obtaining a set of view textures for each of said proxy surfaces based on the initial viewing direction.

3. The method of claim 2, wherein said rendering step (b) further includes:
   receiving a selected viewing direction; and
   determining an object transformation of the object representing a transformation of the object between the initial viewing direction and the received selected viewing direction and expressing the object transformation as a first matrix (M1).

4. The method of claim 3, wherein for each part:
   said rendering step (b)(i) comprises determining the transformation of each part with respect to the object at the received viewing direction and expressing the part transformation as a second matrix (M2), and
   said rendering step (b)(ii) further includes calculating a new viewing direction that is a function of the received viewing direction, the first matrix (M1), and the second matrix (M2).

5. The method of claim 1, wherein said rendering step (b) further includes determining the new viewing direction as a function of an object transformation, the determined part transformation, and an initial selected viewing direction.

6. A method for animating an object, comprising:
   (a) preprocessing the object to be animated including forming proxy surfaces for parts of the object and at least one joint of the object; and
   (b) rendering the proxy surfaces for each part and joint including:
      (i) determining a transformation of each part with respect to the object; and
      (ii) rendering the proxy surfaces of each part at a viewing direction based on the determined part transformation,
      (iii) determining a transformation of each primitive of a joint with respect to the object; and
      (iv) rendering each joint primitive at a viewing direction based on the determined joint primitive transformation, whereby, steps (b)(i)–(b)(iv) can be repeated to animate the object at different viewing directions.

7. The method of claim 6, wherein said pre-processing step (a) comprises:
   dividing an object to be animated into at least two parts that can move independently with respect to said object;
   defining a joint that connects at least two parts of said object, said joint having a plurality of primitives and said joint being capable of changing shape when a part connected to said joint is displaced;
   forming a proxy surface for each part and for each joint; and
   obtaining a set of view textures for each proxy surface.

8. The method of claim 7, wherein said rendering step (b) further includes
   receiving a viewing direction; and
   determining a transformation of the object based on the received viewing direction with respect to the position at which the view textures were calculated and expressing the object transformation as a first matrix.

9. The method of claim 8, wherein for each part:
   said step (b)(i) comprises determining a transformation of each part with respect to the object at the received viewing direction and expressing the part transformation as a second matrix; and
   said step (b)(ii) includes calculating a part viewing direction that is a function of the received viewing direction, the first matrix, and the second matrix.

10. The method of claim 9, wherein for each primitive of a respective joint:
    said step (b)(iii) comprises determining the transformation of the primitive with respect to the object at the received viewing direction and expressing the primitive transformation as a third matrix; and
    said step (b)(iv) further includes calculating a joint viewing direction that is a function of said received viewing direction, the first matrix and the third matrix.

11. A system for animating comprising:
    a preprocessor having a proxy former and a view texture former; and
    an animator coupled to said preprocessor having a transformation matrix calculator, a view direction calculator, and an image based renderer;
    wherein said animator receives object proxies and view textures, from said preprocessor.

12. A method for animating comprising:
    (1) preprocessing an object including the steps of
       receiving an object proxy;
       dividing said object proxy into parts based on motion characteristics of said object proxy;
       forming sub-proxies of said parts based on said dividing step;
       forming view textures for said sub-proxies; and
    (2) rendering said object including the steps of
       receiving said view textures and said sub-proxies;
       selecting a viewing direction;
       calculating the transformation of said sub-proxies based on said viewing direction;
       calculating a new viewing direction based on said transformation; and
       rendering said sub-proxy; whereby said object is animated by repeating said step (2).

13. A system for animating an object, comprising:
    (a) means for preprocessing the object to be animated including forming proxy surfaces for parts of the object; and
    (b) means for rendering the proxy surfaces including:
       (i) means for determining a transformation of each part with respect to the object; and
       (ii) means for rendering the proxy surfaces of each part at a new viewing direction based on the determined part transformation.

14. A system for animating an object, comprising:
    (a) means for preprocessing the object to be animated including forming proxy surfaces for parts of the object and at least one joint of the object; and
    (b) means for rendering the proxy surfaces for each part and joint including:
       (i) means for determining a transformation of each part with respect to the object; and
       (ii) means for rendering the proxy surfaces of each part at a viewing direction based on the determined part transformation,
       (iii) means for determining a transformation of each primitive of a joint with respect to the object; and
       (iv) means for rendering each joint primitive at a viewing direction based on the determined joint primitive transformation.

* * * * *